United States Patent [19]
Coffman

[11] 3,733,159
[45] May 15, 1973

[54] APPARATUS FOR MANUFACTURE OF VOID-FREE AND WARP-FREE SLAB STOCK

[75] Inventor: Paul M. Coffman, Cherry Hill, N.J.

[73] Assignee: Shell Oil Company, New York, N.Y.

[22] Filed: Aug. 5, 1971

[21] Appl. No.: 169,422

Related U.S. Application Data

[63] Continuation-in-part of Ser. No. 857,176, Sept. 11, 1969, Pat. No. 3,608,508, which is a continuation-in-part of Ser. No. 633,673, April 19, 1967, abandoned, which is a continuation-in-part of Ser. No. 524,743, Feb. 3, 1966, abandoned.

[52] U.S. Cl. ............... 425/186, 425/352, 425/406, 425/812, 425/DIG. 44, 264/313, 264/320, 264/325
[51] Int. Cl. .............................................. B29c 3/00
[58] Field of Search .................... 425/394, 406, 193, 425/195, 411, 352, 354, 812, DIG. 35, DIG. 44, 186; 264/320, 313, 325

[56] References Cited
UNITED STATES PATENTS

| | | | |
|---|---|---|---|
| 2,172,243 | 9/1939 | Goodnow et al. | 425/DIG. 44 UX |
| 3,079,642 | 3/1963 | Needham et al. | 264/320 X |
| 3,478,135 | 11/1969 | Randall | 425/812 UX |
| 2,714,226 | 8/1955 | Axelrod | 425/DIG. 44 UX |
| 2,965,946 | 12/1960 | Sweet et al. | 425/DIG. 35 UX |
| 3,235,643 | 2/1966 | Hofer | 425/352 X |

*Primary Examiner*—Robert L. Spicer, Jr.
*Attorney*—Martin S. Baer et al.

[57] ABSTRACT

Void-free slabs or billets of thermoplastic polymer are produced by cooling polymer melt in a mold under pressure while keeping part of the melt in contact with a heat-insulating deformable surface of the mold cavity. Apparatus of this invention comprises a mold having two parallel rigid planar surfaces, a deformable heat-insulating ring placed between said planar surfaces, stiffening or backing means to maintain the shape of the outer wall of the ring, and pressure means for controllable changing the distance between said surfaces.

4 Claims, 12 Drawing Figures

INVENTOR:
PAUL M. COFFMAN
BY: Martin S. Baer
HIS ATTORNEY

INVENTOR:
PAUL M. COFFMAN
BY: Martin S. Baer
HIS ATTORNEY

APPARATUS FOR MANUFACTURE OF VOID-FREE AND WARP-FREE SLAB STOCK

This application is a continuation-in-part of Ser. No. 857,176, now U.S. Pat. No. 3,608,508, which is a continuation-in-part of Ser. No. 633,673 which is a continuation-in-part of Ser. No. 524,743, both now abandoned.

This invention relates to apparatus for producing thermoplastic articles and particularly for producing slab-stock or billets of substantial weight and thickness, free of internal voids and other defects, adapted to conversion to useful articles by forming without remelting. The invention is particularly adapted for use in the formation of large relatively thick slabs of solid crystalline polypropylene and high density polyethylene. Methods of utilizing the apparatus of this invention are described and claimed in parent U.S. Pat. No. 3,608,508.

It has been found that thermoplastics such as polyethylene and polypropylene, including those of very high molecular weight, can be converted to shaped articles by rapid forming operations applied to billets of polymer at a temperature below its melt temperature. To provide fault-free articles the billet must be of suitable shape, usually smooth walled, and free of surface defects as well as of internal defects such as internal voids, stresses or flow lines.

The main object of this invention is to provide apparatus suitable for producing in an economical manner slabs and billets of thermoplastic polymer, particularly of polypropylene or high density polyethylene, which are free of internal voids, surface sinks, warp and other defects and can be converted into useful articles by shaping methods in which the polymer remains unmelted.

Other objects of this invention will appear from the following description, in which reference is made to the drawing wherein:

FIG. 3 being a view of the apparatus and molded article on completion of the molding cycle;

One of the characteristics of polypropylene and high density polyethylene is the large shrinkage in cooling from a liquid to a solid material. For example, polypropylene shrinks about 15 percent in volume and high density polyethylene about 25 percent in cooling from 400°F to room temperature. In conventional methods of cooling a melt of such polymer in a mold, the surface of the polymer mass hardens while the interior part remains molten. As the interior also finally solidifies, surface sinks, internal voids and internal stresses are developed, especially in thick sections. Solid articles containing such internal voids and stresses are generally not suitable for conversion to useful articles by forming or finishing methods in which the polymer remains unmelted. Conventional molding is therefore not adequate for forming thick articles such as slabs or billets, free of internal voids and other defects.

A method for molding large void-free polyolefin blocks is disclosed by Needham et al. in U.S. Pat. 3,079,642. The method comprises placing molten polymer in a block mold, applying pressure while the polymer is cooled until a hardened skin is formed, removing the partially cooled block from the mold and permitting cooling to be completed while pressure is applied to two faces of the block, the remainder of the block remaining unconfined. As pointed out in the patent, the skin of the unconfined portion of the block will tend to rupture unless care is taken not to apply excessive pressure. Insufficient pressure, or the other hand, results in a block which is not void-free. A necessary result of the method of Needham et al. is that a block is formed which has convex sides, for example, a 1-inch block has sides that extend at the center one-fourth inch beyond the edges of the upper and lower surface. Substantial trimming, with consequent waste, is necessary to produce blocks having straight sides.

The apparatus of the present invention makes possible the production of large, thick, molded thermoplastic articles, such as slabs or billets, which are substantially free of internal voids and other defects without the disadvantages encountered in the method of Needham et al. These articles may be useful as such, but are especially useful for further conversion into other articles of substantial thickness by conversion methods not requiring remelting of the polymer. The apparatus of this invention is especially adapted for production of articles which have straight side walls.

The apparatus of this invention is quite inexpensive compared to apparatus required for producing thermoplastic shapes by methods such as injection molding, blow molding or extrusion. Slabs and billets produced by this invention are relatively inexpensive and can be converted to finished articles of more complex shape at a high rate in an economical over-all process.

Figure 1:
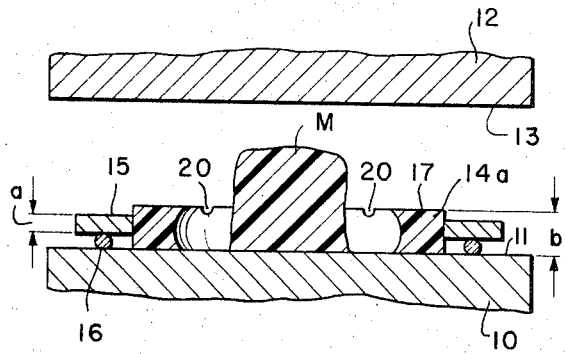
FIGS. 1, 2 and 3 illustrate one form of apparatus of this invention, FIG. 1 being a diagrammatic view in vertical section of apparatus in which a molten plastic mass is in position for molding, FIG. 2 being in view of the apparatus of FIG. 1 while the plastic mass is under molding pressure.
Figure 2:
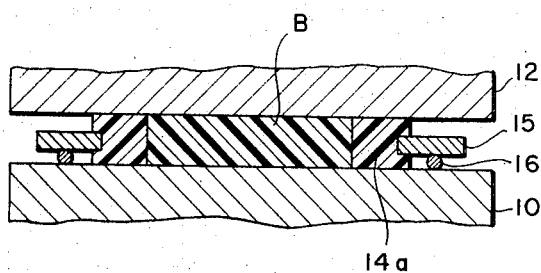
Figure 3:
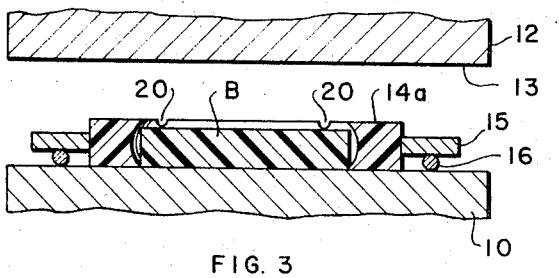

Referring now to the drawing, wherein corresponding parts are designed by the same numeral, a preferred embodiment of the apparatus and its use in the method of forming a plastic article are illustrated in FIGS. 1, 2 and 3. The principal parts of the apparatus are a rigid lower press or platen member 10, having a flat surface 11; a rigid upper press or platen member 12, having a flat surface 13; a deformable die member 14a; a rigid backup ring 15; and a shim 16 which supports the backup ring.

The upper and lower platen may be individually movable toward and away from each other, or one may be stationary and the other movable. Their surfaces are parallel. The surfaces 11 and 13 constitute the upper and lower surfaces of the die in which the polymer billets are formed. At least one and preferably both the platen members are adapted to cool polymer in the mold.

The circumference of the plastic article is defined by die member 14a, which is a deformable body made of material which is essentially rigid when not subjected to force, is capable of flow under molding pressure, and is a poor conductor of heat.

The deformable die member is typically made of rubber or of a rubber-like material or composition; this includes any elastomeric materials such as vulcanized rubber and synthetic elastomers, which have sufficient rigidity to retain their shape when not under pressure and which are within their elastic limits capable of flow similar to that of a liquid when under pressure during the molding process. The chemical composition of the elastomer is not important from the point of view of this invention, provided it has the desired physical characteristics, including poor heat conductance, is not degraded at the highest temperatures to which it will be exposed during the molding operation, and is chemically inert to the thermoplastic charge.

Figure 8:
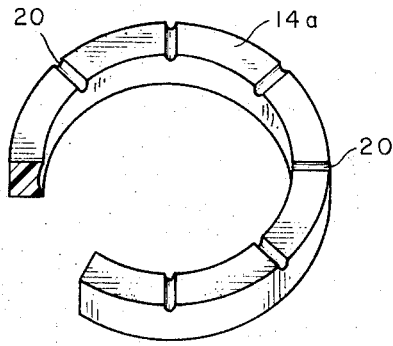
FIGS. 8, 9, 10 and 11 are isometric views, some partly cut away, of shapes of deformable die members which can be utilized in the apparatus of this invention.
Figure 9:
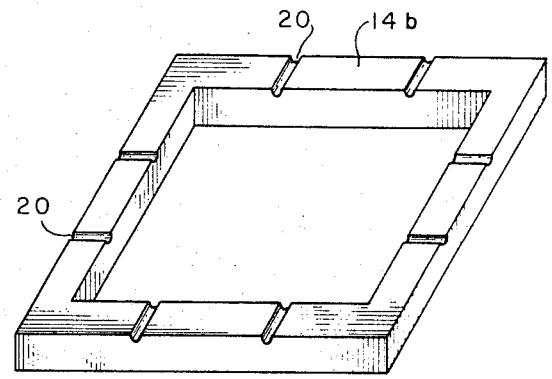

The deformable die member or die ring may be of circular, rectangular or any other desired configuration. A circular and a square die ring are illustrated in FIGS. 8 and 9 as rings 14a and 14b, respectively.

An important feature of die ring 14a is that its upper surface is grooved or notched at intervals which radial slots, grooves or notches 20. These serve to permit captured air to escape during the molding process. There should be at least four such slots spaced about 90° apart, but a much larger number may be employed if desired.

Omission of the radial air escape grooves may cause the production of billets having deformities in the upper surface due to air retained between the die ring and upper platen. It is, however, within the scope of this invention to operate with a die ring having an ungrooved upper surface.

A further important feature of the apparatus of this invention is the use of means for reinforcing or stiffening the outer wall or perimeter of the die ring, as further described and illustrated.

The wall configuration of the die ring affects the shape of the plastic billet formed in the process. In the method of Needham et al., for example, the plastic mass solidifies while unconfined at its sides, resulting in a block having convex sidewalls. A billet having convex sidewalls is also obtained if the deformable die ring used in this invention has a straight wall, especially if it is used either without a backup ring or other stiffening means in the center part of its outer wall or with a backup to its full height, e.g., when it is used as liner for a right cylindrical die.

The die ring is selected so that the volume enclosed by the undeformed die ring and the rigid die surfaces is about the same as the volume of polymer melt needed to produce the desired billet. The height of the die ring is generally 115–135 percent of the height of the finished billet.

The grooves in the die ring may be narrow slots, e.g., one-sixteenth inch by one-sixteenth inch in section. Their dimensions are not critical. They should be relatively shallow, e.g., 10 percent or less of the height of the die ring, and should in any event terminate above the level of the finished billet. The grooves may be omitted, but at the risk of producing billets having irregular upper surfaces.

Preferred embodiments of the die ring are illustrated in FIGS. 1–3 and 8 (a partly cut-away isometric view). Here the die ring has an inner wall of concave curvature.

When used with a rigid backup ring whose height is about one half of the height of the finished billet, as illustrated, the latter will have completely or substantially straight sidewalls. The backup ring is preferably from one-fourth to three-fourths of the height of the billet being formed and should be vertically centered, being supported by a suitable shim, as illustrated.

In a typical arrangement, to produce a billet having a height of 100 units, dimension $a$ in FIG. 1 would be 50 units and $b$ would be 130 units, with the ring 16 being centered so that the height of shim 16 is about 40 units.

In an alternative embodiment of this invention, the deformable body, 14c, is an elastomeric ring which contains reinforcing or stiffening means at or near its outer wall.

Figure 5:
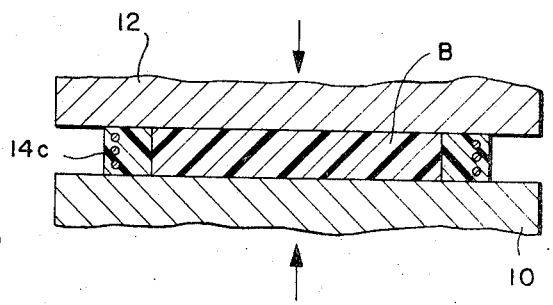
FIGS. 4 and 5 illustrate an alternative apparatus of this invention, FIG. 4 being a diagrammatic view in vertical section of apparatus in which a molten plastic mass is in position for molding and FIG. 5 being a view of the apparatus of FIG. 4 while the plastic mass is under molding pressure.
Figure 4:
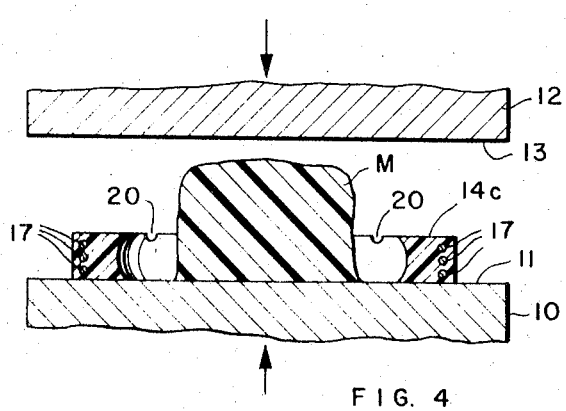
Figure 10:
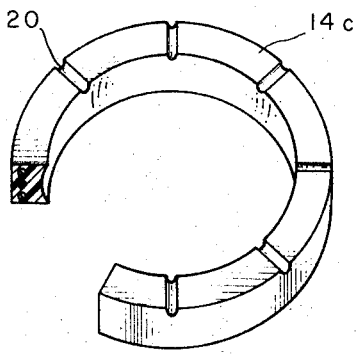
Figure 11:
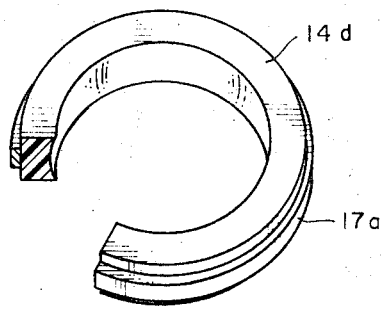

Apparatus including a reinforced die ring is illustrated in FIGS. 4 and 5, and suitable reinforced die rings in FIGS. 10 and 11. The apparatus consists of two opposed, flat-surfaced rams 10 and 12 having rigid, flat-surfaced rams 10 and 12 having rigid, flat surfaces 11 and 13 and a die ring 14c acting as deformable die. As shown, the outer wall of die ring 14c is reinforced by embedded wires 17. Other stiffening means may be employed, such as band of metal or firm fabric adhesively secured to the outer wall of the die ring, preferably to the center third thereof, as shown in FIG. 11.

In another modification of the invention, not shown, the die ring may be replaced by a fluid-filled solid deformable toroid, utilized with reinforcement of its outer perimeter.

Conventional parts of the apparatus which are not required to explain the present invention are not shown in the drawing. For example, the conventional heating and cooling means which permit controlling the temperature of the rigid die members are omitted. Also not shown are the press employed for forcing the die surfaces together during the molding operation, and associated equipment such as means for removing the completed article.

In the formation of void-free thermoplastic articles by compression molding utilizing the apparatus of this invention, FIG. 1 illustrates the position of the dies after a molten plastic mass M has been placed on platen surface 11. Platen members 10 and 12 are then urged toward each other. One may be stationary or both may be moved. When the upper surface 13 contacts the plastic mass it forces the mass to conform to the shape defined by die surfaces 11 and 13 and deformable die member 14a. As the mold cavity closes, upper platen surface 13 first contacts plastic mass M, causing the mass to flatten and flow out toward die member 14a. When upper platen surface 13 first contacts the upper surface of the die ring, the plastic mass has not completely filled the available space. At that point, air would be trapped in the die if slots 20 were not provided. With the slots present, trapped air escapes as the gap between the platens continues to decrease. When the polymer has completely filled the available mold space, the pressure is maintained but there is no further substantial immediate movement. Cooling is then carried out by circulating cooling fluid through at least one, and suitably both platens. The elastomeric material of the liner acts as insulator and prevents or slows down hardening of the molten plastic mass with which it is in contact, so long as a substantial portion of the total plastic mass M is still molten. Accordingly, while the plastic mass cools and shrinks, the portions thereof which contact the cooled die surfaces harden first. Pressure is maintained while the plastic mass cools and shrinks. This mold pressure forces elastomeric insert 14a gradually to deform, by liquid-like flow, into the configuration illustrated in FIG. 2. Since the molten portion of the plastic mass is under continuous molding pressure, it solidifies into a void-free, substantially strain-free solid body B.

The molding operation illustrated in FIGS. 4 and 5 is essentially like that of FIGS. 1 and 2. FIG. 4 illustrates the apparatus which molten plastic mass M in place and FIG. 5 after full molding pressure is applied.

Figure 6:
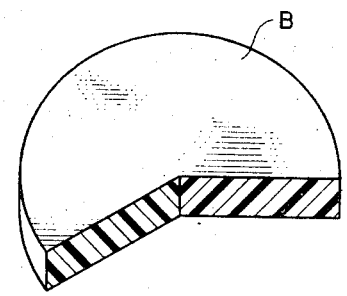
FIG. 6 is an isometric view of an article produced in the apparatus of this invention.

FIG. 6 illustrates a circular billet B formed according to this invention; a segment is cut away for easier understanding of its shape. The top and bottom surfaces are flat and smooth, conforming to die surfaces 11a and 12a. The edges are essentially straight as a result of the use of concave-walled die ring 14a and backup ring 15.

Figure 7:
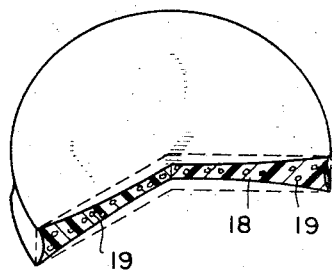
FIG. 7 is an isometric view of a defective article, produced without utilizing this invention.

FIG. 7 illustrates what happens when a plastic mass is compression molded in a rigid die mold having a straight, rigid die-wall surface. After the mass has solidified, it is found to contain internal voids 19 and to have a concave side wall and concave, more or less lens-shaped top and bottom surfaces 18. While the lens-shaped surfaces can be machined to plane surfaces, albeit with substantial wastage of material, the internal voids and associated stresses make such a molded article useless for many further forming operations.

Several possible shapes of the elastomeric insulating mold member are illustrated in FIGS. 8, 9, 10 and 11. FIG. 8 illustrates a ring, 14a, having a concave inside wall, as used in apparatus of FIGS. 1–3. FIG. 9 illustrates a square tubular mold member. FIG. 10 illustrates the wire-reinforced ring 14c used in the apparatus of FIGS. 4–5. FIG. 11 illustrates a ring reinforced by an outer band 17a, which may be a strong, non-elastic fabric, a metal, or other suitable reinforcing means, adhesively or otherwise secured to the outer wall of die ring 14d. While it is preferred to reinforce about the central third of the outer wall, it is within the scope of the invention to extend the reinforcement and even use a die ring with a completely reinforced outer wall.

Figure 12:
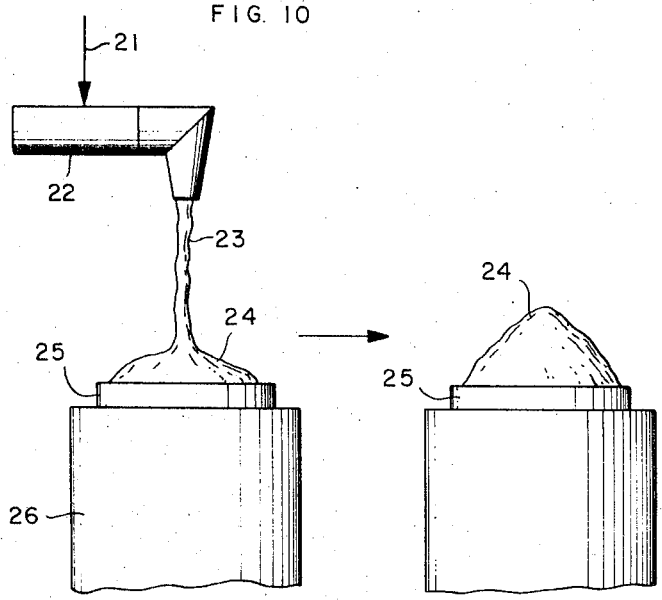
FIG. 12 is a schematic view of an apparatus assembly illustrating the process of forming articles when utilizing this invention.

FIG. 12 illustrates a preferred mode of utilizing the apparatus of this invention. Thermoplastic polymer to be molded is charged in any desired form, e.g., as nibs or pellets, through line 21 to machine 22 wherein the polymer is converted to a molten mass. The machine is typically a screw extruder. The molten polymer is typically quite viscous, having, for example, a viscosity in the range of $10^4$ to $10^6$ poise. A stream 23 of such melt is separated into portions 24 of predetermined weight. For example, melt may be collected on a sheet or thin plate 25 which has a surface to which the polymer does not adhere, e.g., a surface coated with a fluorohydrocarbon polymer such as polytetrafluoroethylene. The sheet or plate rests on a table 26 which may be a weighing table or a portable table on a scale. The surface of table 26, or sheet 25, is heated or heavily insulated to prevent premature cooling of the polymer melt. Sheet 25 or table 26 is removed and replaced by another after a slab of predetermined weight has been collected. Polymer mass 24 is thicker, but smaller in area, than the mold. It is transferred to the molding station where it is placed on the surface 11 of platen 10. Rubber die ring 14a, shim 16 and backup ring 15 are then placed on die surface 11. The die is then closed and the melt is molded into a void-free, strain-free article as previously described. The mold is opened, and the article is removed from the surface of platen 10, and transferred, is necessary, to a trimming station, not shown, where any irregular edge portion of the billet is trimmed off, leaving it a smooth sided disc capable of further conversion to a useful article by other forming methods. Other trimming operations may be performed, e.g., planing the top and bottom surfaces, drilling holes or the like. The prepared billets are suitable for conversion into finished articles of more complex shapes by forming operations in which the polymer undergoes flow while in the solid state.

Preferred embodiments of this invention have been described. The apparatus of this invention is, however, capable of other modifications while remaining within the scope of this invention. An example of a simple modification includes the use of the yieldable die ring as insert in a rigid cylindrical die.

Conditions for utilizing the described apparatus in the molding of void-free billets are detailed in the parent patent hereof, U.S. Pat. No. 3,608,508. The invention leads itself readily to the production of billets of one-fourth inch or greater thickness. Billets of one-half inch to 2 inch thickness are particularly useful. The molding pressure required for producing satisfactory void-free articles is generally in the range from 10 to 400 psi. While higher pressures can be used without adverse effects, they are not ordinarily required. With a solid rubber liner the pressure required to mold void-free articles is generally between about 50 and about 100 psi, but lower pressures, down to about 20 psi minimum may also give useful results, and higher pressures may be employed if desired. With an inflated liner, molding pressures of 10 to 20 psi are generally preferred and even lower pressures may be sufficient.

The melt should be at a temperature above its melting point when placed in the mold. If the mold is heated to about the temperature of the melt, the resulting article can have top and bottom surfaces equal in the quality to the mold surfaces. However, polymer may be placed into relatively cool mold, e.g., one at 60°–200°F, to shorten the cycle time. In that case, the surface which contacts the cool mold may have imperfections but these can be readily trimmed off the molded article.

After the mold is closed and under pressure, at least one, and preferably both, of the heat-conducting dies are cooled, e.g., by circulating cooling water through internal channels, the known manner. The article must remain in the mold under pressure until it is completely solidified.

The apparatus of this invention can be used as illustrated for forming individual thick billets for further reshaping. The invention is of advantage for the production of large, thick slabs of polymers from which individual billets can then be cut for further reshaping, e.g., in forming slabs or billets of at least 2 ft area and especially those of at least about 10 ft area with thickness from one-half inch to 2 inches or greater, and weighing up to about 500 pounds.

The cooling time required to solidify an article in the mold varies approximately as the square of the thickness. A time of at least about 5 minutes is required to solidify a polypropylene article of one-half inch thickness; articles of 1 inch, 1½ inch, and 2 inch thickness require at least about 20, 45 and 80 minutes cooling time for complete solidification.

The invention is of special advantage in forming void-free billets from crystalline polymers, such as linear or high-density polyethylene and isotactic polypropylene and other stereo-regular thermoplastic polyolefins. It may be employed to advantage in forming billets from other thermoplastic polymers, such as polyamides (Nylon), polyacetals, polycarbonates, polyvinylchlorides, and the like, and is of particular advantage for those polymers which shrink substantially while cooling from the melt.

The polymer compositions may contain various types of known additives, such as stabilizers against thermal or actinic degradation; pigments or dies; and fillers of various types, including powdered materials and fibrous materials, e.g., talc, glass fibers, asbestos, etc.

I claim as my invention:

1. Apparatus for producing plastic billets comprising a mold consisting of two parallel rigid planar surfaces and a deformable, heat-insulating ring having flat bottom and top surfaces, arranged so that upon closure of the mold each of said bottom and top surfaces of said ring is in contact with one of said planar surfaces and the mold cavity is defined by portions of said rigid planar surfaces and the interior surface of said ring; reinforcing means for from about the central one fourth to about the central three fourths of the outer wall of said ring; and pressure means for controllably changing the distance between said mold surfaces.

2. Apparatus according to claim 1 wherein said ring has at least four radial grooves in its top surface, spaced about equally from each other and having a depth no more than 15 percent of the height of the billet to be formed in said mold.

3. Apparatus according to claim 2 wherein said reinforcing means comprises a band of substantially non-deformable material around at least one third of the height of the outer wall of said ring.

4. Apparatus according to claim 2 wherein the inner wall of said ring is of concave curvature.

* * * * *